Patented Aug. 18, 1936

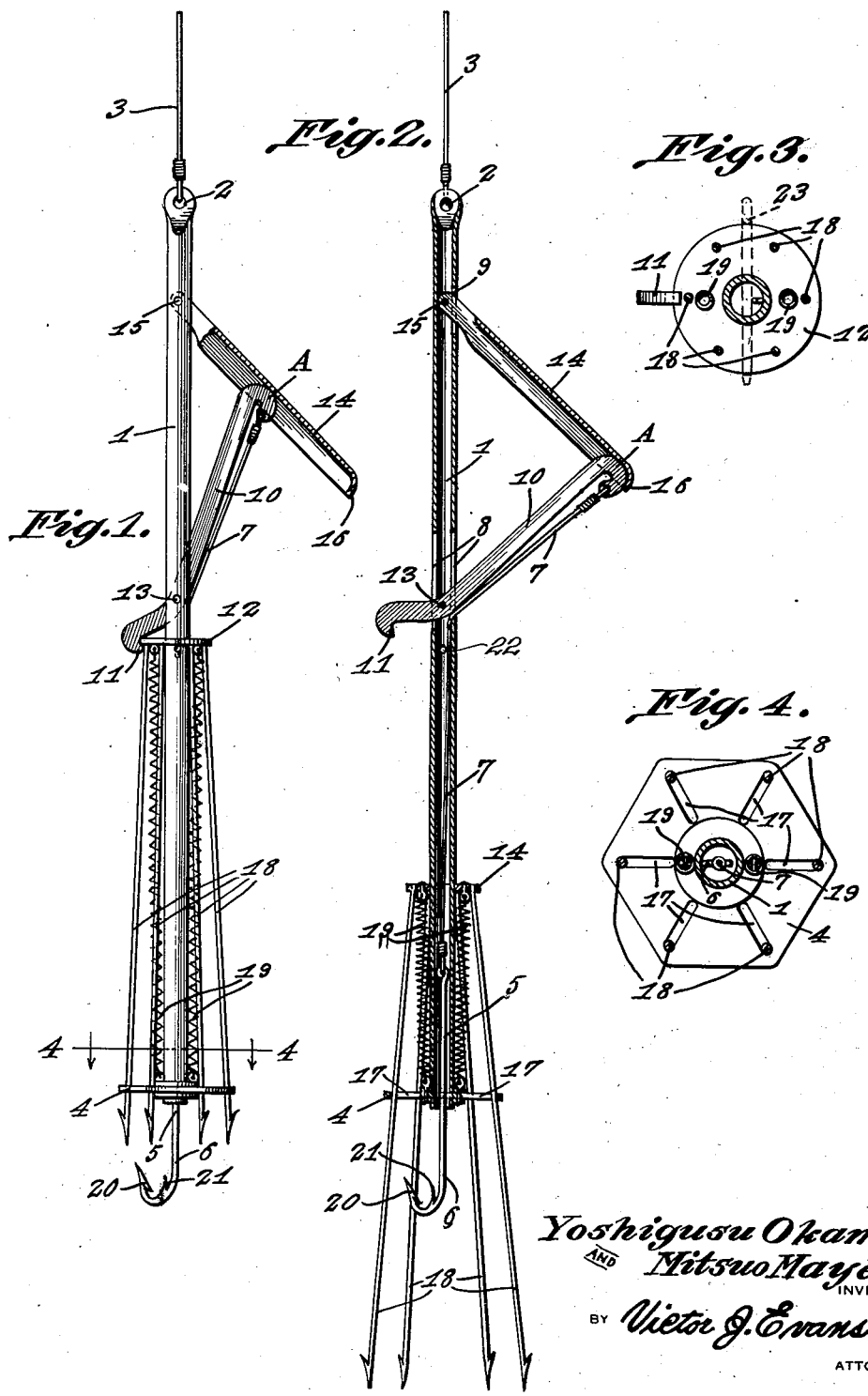

2,051,737

UNITED STATES PATENT OFFICE 2,051,737

FISH HOOK AND SPEAR COMBINATION

Yoshigusu Okamoto and Mitsuo Mayeda,
Waialua, Oahu, Territory of Hawaii

Application July 22, 1935, Serial No. 32,628

3 Claims. (Cl. 43—36)

This invention relates to a fishing device of the character employable on a line and has for the primary object the provision of a device of this character which will automatically harpoon a fish when the latter strikes or nibbles the bait, thereby positively securing the fish against escape when being landed by the line in the usual way.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a side elevation, partly in section, illustrating a fishing device constructed in accordance with our invention.

Figure 2 is a vertical sectional view illustrating the same.

Figure 3 is a sectional view showing a safety device for holding the fishing device in cocked position against accidental release.

Figure 4 is a sectional view taken on the line 4—4 of Figure 1.

Referring in detail to the drawing, the numeral 1 indicates a tubular stem having one end shaped to form an eye 2 to which a line 3 is secured. The other end of the stem 1 has fixed thereto a plate 4 and entering said last-named end of the stem is the shank 5 of a fishing hook 6. The shank 5 has a trigger cord 7 attached thereto and extends outwardly of the stem 1 by way of one of the slots of a pair of slots 8. The stem also is provided with a slot 9 adjacent the eye 2. The cord 7 is attached to one end of a trigger 10, the opposite end of which is in the form of a hook 11 providing a catch to engage with a slidable plate 12 mounted on the stem 1. The trigger 10 adjacent the hook 11 is pivoted to the stem, as shown at 13, the trigger passing through the slots 8. The end A of the trigger is rounded and is received in a guard 14 and has slidable contact therewith. One end of the guard enters the stem by way of the slot 9 and is pivoted to said stem, as shown at 15. The guard 14 is of channel iron construction and has its free end closed by a wall 16 acting as a stop to prevent the end A of the trigger from moving outwardly of the guard. The guard acts as a protection to the trigger when the latter is set in a cocked position, as shown in Figure 1, and prevents tripping of the trigger by coming in contact with some obstacle.

The plate 4 is provided with a series of radially arranged slots 17 through which slide harpoons 18. The non-penetrating ends of the harpoons are secured to the plate 12 and the latter is connected to the plate 4 by springs 19 of the coil type and adapted to be placed under tension when the plate 12 is brought into engagement with the trigger, as shown in Figure 1, positioning the penetrating ends of the harpoons adjacent to or between the hook 6 and the plate 4 exposing the barbs 20 and 21 of the hook away from the harpoons so that bait placed on the hook can be easily taken or grasped by a fish. A pull upon the hook 6 releases the trigger 10 from the plate 12 and the springs 19 drive the harpoons past the hook penetrating the fish, thereby positively securing the fish against escape. The barbs 20 and 21 are spaced from one another and cooperate in preventing a fish from becoming detached from the hook.

The stem 1 adjacent the pivot 13 of the trigger is provided with aligned openings 22 for the purpose of receiving a safety pin 23 for retaining the plate 12 against accidental disconnection from the trigger. The pin is only employed when baiting the hook 6 and after the cocking of the harpoons and is removed from the stem prior to the device being cast into the water.

Having described the invention, we claim:

1. A fishing device comprising a stem connectible to a fishing line, a fishing hook slidably supported by the stem, a series of harpoons slidably supported on the stem and capable of occupying a cocked position to expose the hook, a trigger carried by the stem to retain the harpoons in cocked position, a spring driving means for the harpoons, a connection between the hook and the trigger to free the harpoons for movement beyond the fishing hook, and a guard for the trigger pivotally connected to the stem.

2. A fishing device comprising a tubular stem connectible at one end to a fishing line, a fishing hook partly received within the other end of the stem, a guide plate fixed on the last-named end of the stem, a series of harpoons slidably supported in the guide plate, a second plate slidable on the stem and having the harpoons fixed thereto, spring means connected to the second plate and to the guide plate for driving the harpoons past the fishing hook, a trigger carried by said stem to engage the second plate to hold the harpoons in cocked position, and a connection between the trigger and the hook for releasing said trigger from the second plate.

3. A fishing device comprising a tubular stem connectible at one end to a fishing line, a fishing hook partly received within the other end of the stem, a guide plate fixed to the last-named end of the stem, a series of harpoons slidably supported in the guide plate, a second plate slidable on the stem and having the harpoons fixed thereto, spring means connected to the second plate and to the guide plate for driving the harpoons past the fishing hook, a trigger carried by said stem to engage the second plate to hold the harpoons in cocked position, a connection between the trigger and the hook for releasing said trigger from the second plate, and a channeled guard engageable with the trigger and pivoted to the stem.

YOSHIGUSU OKAMOTO.
MITSUO MAYEDA.